(12) United States Patent
Weng

(10) Patent No.: US 8,246,193 B2
(45) Date of Patent: Aug. 21, 2012

(54) SOLAR LAMP

(76) Inventor: Rui-Hong Weng, Taishan Township, Taipei County (TW)

(*) Notice: Subject to any disclaimer, the term of this patent is extended or adjusted under 35 U.S.C. 154(b) by 153 days.

(21) Appl. No.: 12/715,398

(22) Filed: Mar. 2, 2010

(65) Prior Publication Data

US 2011/0216529 A1    Sep. 8, 2011

(51) Int. Cl.
*F21L 4/08*    (2006.01)
(52) U.S. Cl. .................. 362/183; 362/157; 362/800
(58) Field of Classification Search .............. 362/183, 362/157
See application file for complete search history.

(56) References Cited

U.S. PATENT DOCUMENTS

| | | | | | |
|---|---|---|---|---|---|
| 4,325,108 | A * | 4/1982 | Spingler | ................... | 362/183 |
| 4,490,127 | A * | 12/1984 | Matsumoto et al. | ........... | 474/110 |
| 4,782,432 | A * | 11/1988 | Coffman | ................... | 362/184 |
| 6,030,089 | A * | 2/2000 | Parker et al. | ................... | 362/103 |
| 6,326,734 | B1 * | 12/2001 | Gahwiler | ................... | 315/149 |
| 7,303,302 | B2 * | 12/2007 | Harris | ................... | 362/105 |
| 7,699,493 | B2 * | 4/2010 | Canella | ................... | 362/200 |
| 7,878,678 | B1 * | 2/2011 | Stamatatos et al. | ........... | 362/184 |
| 2007/0121335 | A1 * | 5/2007 | Fujimoto et al. | ............. | 362/475 |
| 2008/0068825 | A1 * | 3/2008 | Harris | ................... | 362/105 |
| 2009/0180278 | A1 * | 7/2009 | Cheng et al. | ................. | 362/106 |
| 2010/0277895 | A1 * | 11/2010 | Huang | ................... | 362/105 |

* cited by examiner

*Primary Examiner* — Jong-Suk (James) Lee
*Assistant Examiner* — Leah S Macchiarolo
(74) *Attorney, Agent, or Firm* — Chun-Ming Shih; HDLS IPR Services

(57) ABSTRACT

A solar lamp includes a solar panel, a reserve power unit, a luminescence module and a transmission module. The solar panel connecting the reserve power unit transforms solar energy into electric energy, and stores electric energy into the reserve power unit. The luminescence module connecting the reserve power unit receives electric energy outputting from the reserve power unit. The transmission module comprises a port, wherein one end of the port connects the reserve power unit, and the other one end of the port electrically connects an electronic product. Therefore, the solar lamp would supply electric energy into the electronic product by the transmission module, or the electronic product would supply electric energy into the solar lamp by the transmission module.

1 Claim, 7 Drawing Sheets

SOLAR LAMP

BACKGROUND OF THE INVENTION

1. Field of the Invention

The present invention relates to a solar lamp, and particularly to a solar lamp for interacting with electronic products.

2. Description of Related Art

In general, the conventional solar lamp can transform the light energy into the electric energy for storing to its reserve power unit via its solar panel; however, the electric energy is just supplied to the solar lamp itself for illumination. Furthermore, the reserve power unit of the solar lamp can not supply the electric energy to the electronic product as power of the electric product is exhausted. In addition, use of the solar lamp must be waited for charging as the shortage of power of the reserve power unit. It is inconvenient that the solar lamp would not be used immediately as the user needs to use in emergent.

Therefore, the invention provides a solar lamp to mitigate and/or obviate the aforementioned problems.

SUMMARY OF THE INVENTION

A main object of the present invention is to provide a solar lamp for supplying electric energy into an electronic product or being supplied with electric energy in a lightless environment.

To achieve the above-mentioned object, a solar lamp in accordance with the present invention is provided, the solar lamp includes: a solar panel transforming solar energy into electric energy; a reserve power unit connecting the solar panel and storing electric energy; a luminescence module connecting the reserve power unit and receiving electric energy outputting from the reserve power unit; and a transmission module comprising a port, wherein one end of the port connecting the reserve power unit and the other end of the port electrically connecting an electronic product.

For further understanding of the present invention, reference is made to the following detailed description illustrating the embodiments and examples of the present invention. The description is for illustrative purpose only and is not intended to limit the scope of the claim.

DETAILED DESCRIPTION OF THE PREFERRED EMBODIMENTS

Figure 1:
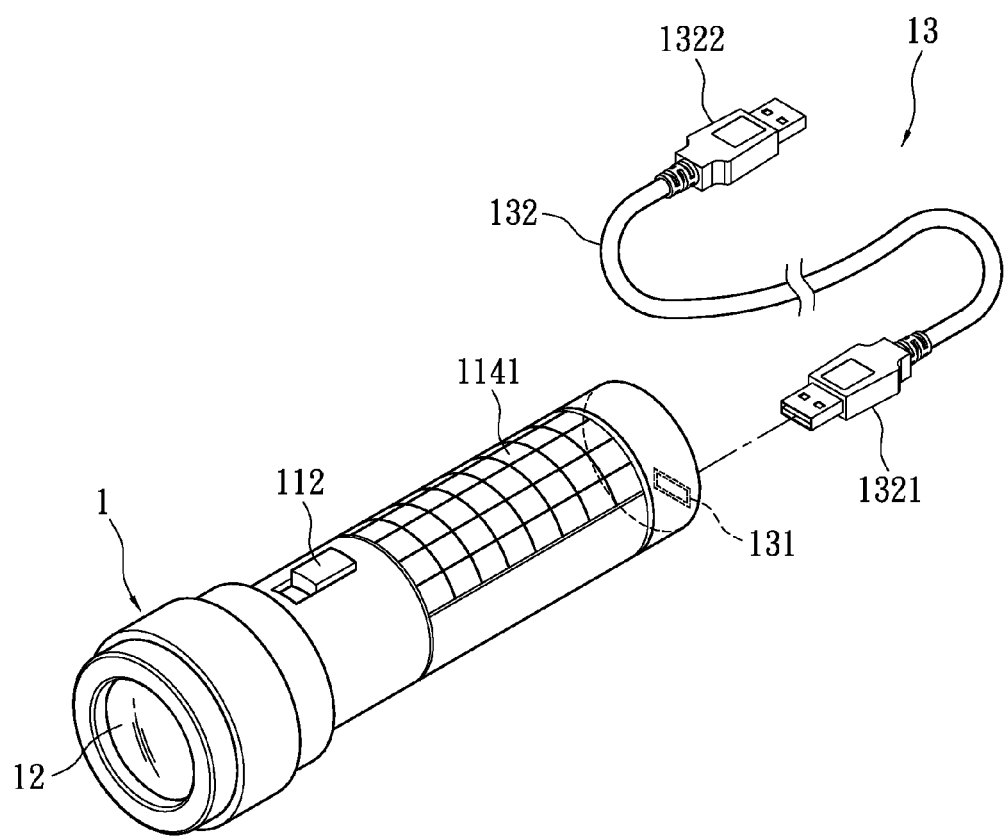
FIG. 1 is a perspective view of the solar lamp of a first embodiment of the present invention.
Figure 2A:
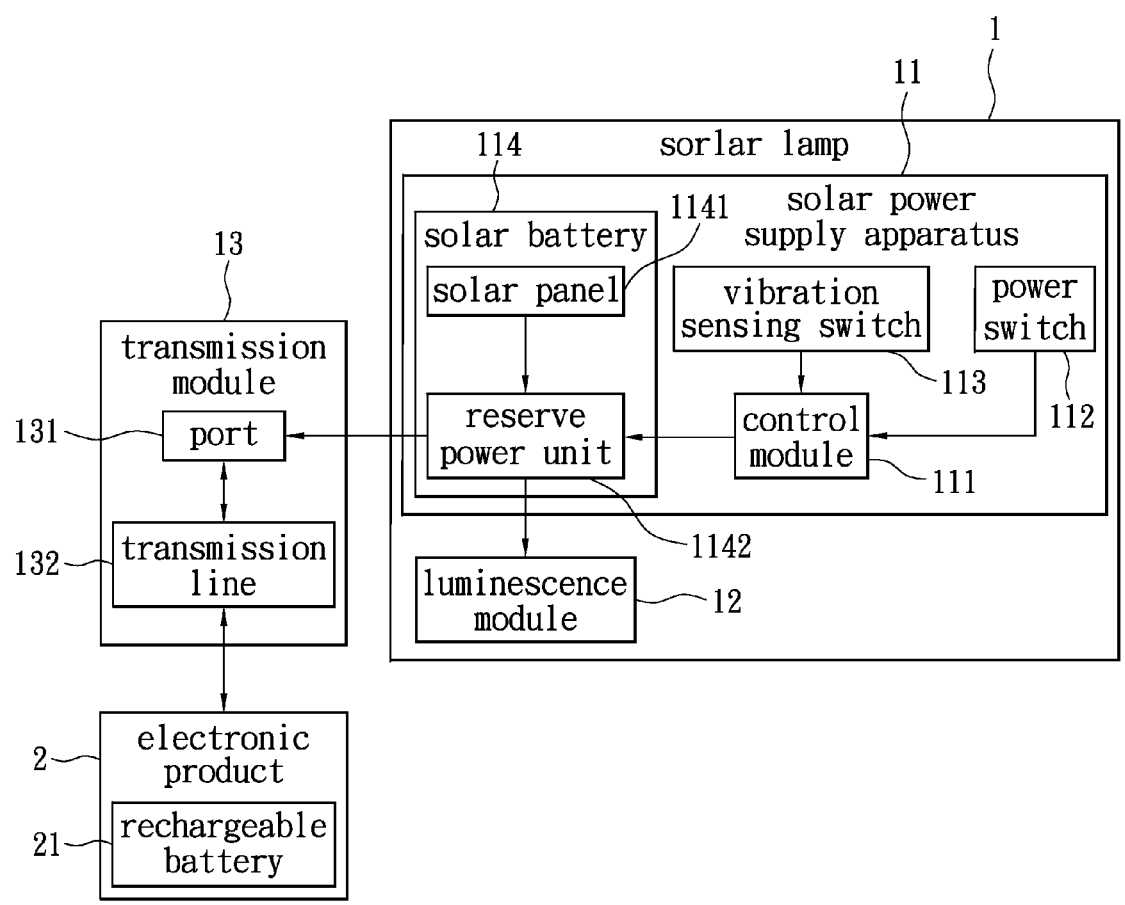
FIG. 2A is a circuit block diagram of the solar lamp of a first embodiment of the present invention.

References are made to FIG. 1 and FIG. 2A, a solar lamp 1 includes a solar power supply apparatus 11, a luminescence module 12, and a transmission module 13. The solar power supply apparatus 11 includes a control module 111, a power switch 112, a vibration sensing switch 113, and a solar battery 114.

The solar battery 114 includes a solar panel 1141 and a reserve power unit 1142. The solar panel 1141 could automatically transform the light energy into the electric energy as the solar panel 1141 is in a place of light energy source, and then the electric energy could be stored in the reserve power unit 1142. The vibration sensing switch 113 can output a sensing signal to the control module 111 by sensing a status, such as, vibration status or static status, of the solar lamp 1. The control module 111 connects to the reserve power unit 1142 and the vibration sensing switch 113 for controlling the output of the electric energy storing in the reserve power unit 1142 by the sensing signal from the vibration sensing switch 113. The power switch 112 connecting the control module 111 provides a switch signal to the control module 111. The switch signal controls that the status of the solar lamp 1 is on or off. The control module 111 would start the vibration sensing switch 113 or close the vibration sensing switch 113 according to the switch signal. The luminescence module 12 connects the reserve power unit 1142. The control module 111 controls and determines if the reserve power unit 1142 outputs the electric energy to the luminescence module 12.

The solar lamp 1 in a static status (unused) as the power switch 112 operates, so the vibration sensing switch 113 outputs the sensing signal which is a short-circuit signal. The control module 111 controls that the reserve power unit 1142 stops to output the electric energy to the luminescence module 12 by the sensing signal, so the luminescence module 12 does not shine. Additionally, the solar lamp 1 in a vibration status (used) as the power switch 112 operates, so the vibration sensing switch 113 outputs the sensing signal which is a conduction-circuit signal. The control module 111 controls that the reserve power unit 1142 outputs electric energy to the luminescence module 12 by the sensing signal, so the luminescence module 12 shines.

The vibration sensing switch 113 automatically senses the status of the solar lamp 1 at set intervals, and outputs the sensing signal to the control module 111. Therefore, the control module 111 would control the reserve power unit 1142 at set intervals for continuously outputting the electric energy or stopping to output the electric energy to the luminescence module 12. For example, the vibration sensing module 113 transmits the sensing signal into the control module 111 as the vibration status of the solar lamp 1 was sensed, and therefore the control module 111 would control the reserve power unit 1142 continuously outputting the electric energy to the luminescence module 12 until the next preset time. If the vibration status of the solar lamp 1 is sensed on the next preset time, the reserve power unit 1142 will continuously output electric energy to the luminescence module 12. If the static status of the solar lamp 1 is sensed on the next preset time, the reserve power unit 1142 will stop to output electric energy to the luminescence module 12. Therefore, the vibration sensing switch 113 would sense the status of the solar lamp 1 at set intervals and output the sensing signal to the control module 111, and the control module 111 would control the reserve power unit 1142 to output electric energy to the luminescence module 12 or not.

The solar lamp 1 further includes the transmission module 13, and the transmission module 13 has a port 131 and a transmission line 132. The port 131 is located at the solar lamp 1, and two end of the transmission line 132 separately has a first connector 1321 and a second connector 1322. As shown in FIG. 1 and FIG. 2A, the transmission module 13 provides one end of the port 131 electrically connecting the reserve power unit 1142 of the solar battery 114, and the other end of the port 131 electrically connecting the first connector 1321. The transmission module 13 provides the second connector 1322 electrically connecting an electronic product 2. Therefore, the port 131 would electrically connect the electronic product 2 indirectly. Furthermore, the first connector 1321 and the second connector 1322 can be Universal Serial Bus (USB) connector, IEEE1394 connector, and so on.

Inside of the electronic product 2 includes a rechargeable battery 21 connecting the transmission module 13. Therefore, there are two electric energy transmission ways, which electric energy transmits between the solar lamp 1 and the electronic product 2 as follows. (1) The reserve power unit 1142 of the solar lamp 1 supplies electric energy. The solar panel 1141 transforms light energy into electric energy and stores electric energy into the reserve power unit 1142 as receiving light energy. The reserve power unit 1142 would supply electric energy to the rechargeable battery 21 of the electronic product 2 by transmission module 13. (2) The reserve power unit 1142 of the solar lamp 1 is supplied with electric energy. If the solar lamp 1 needs to shine as electric energy of the reserve power unit 1142 is efficiency, the rechargeable battery 21 of the electronic product 2 would output electric energy into the reserve power unit 1142 by transmission line 132. Therefore, the solar lamp 1 will shine.

Figure 2B:
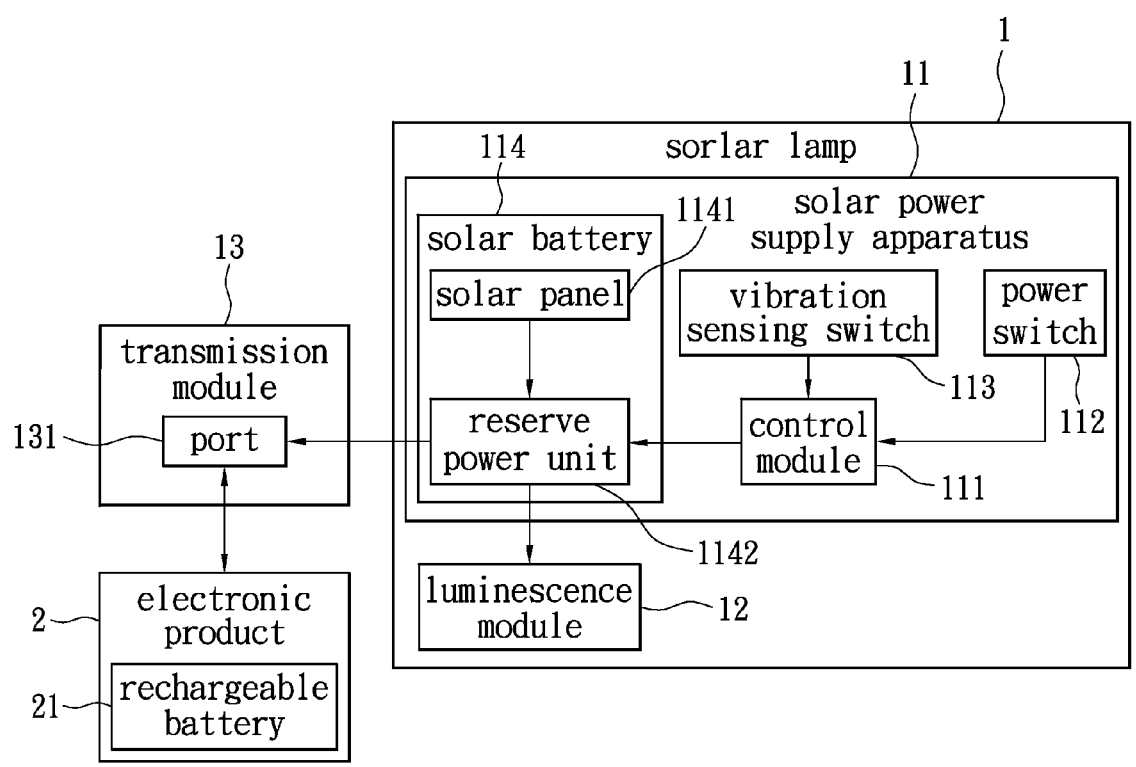
FIG. 2B is a circuit block diagram of the solar lamp of a second embodiment of the present invention.

Please refer to FIG. 2B illustrating a second embodiment of the solar lamp 1. The other end of the port 131 would electrically connect the electronic product 2 directly as the electronic product 2 has connector electrically connecting the other end of the port 131.

Figure 3:
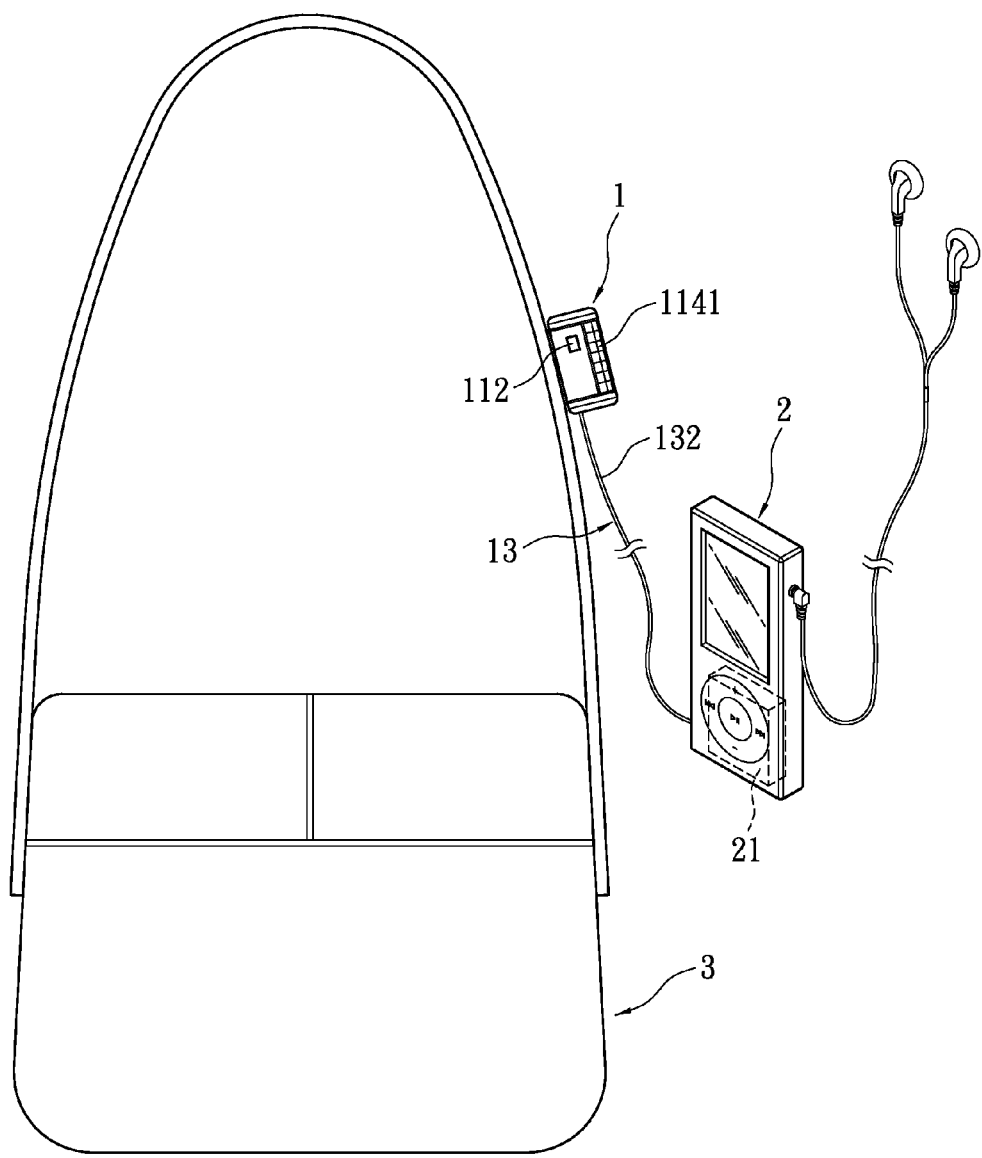
FIG. 3 is a perspective view of the solar lamp of a third embodiment of the present invention.

Please refer to FIG. 3 illustrating a third embodiment of the solar lamp 1. The solar lamp 1 could be applied with a handbag. For example, user could suspend the solar lamp 1 on obviously position of the handbag 3 (carrying strap of the handbag 3). The solar lamp 1 would provide warning-lighting, when user walks with carrying the handbag 3 and the power switch 112 of the solar lamp 1 turns on. Besides, the solar lamp 1 connects the electronic product 2 which is a walkman in the present embodiment. Inside of the electronic product 2 includes the rechargeable battery 21. The reserve power unit 1142 of the solar lamp 1 would transmit electric energy into the rechargeable battery 21 of the electronic product 2 as electric energy of the rechargeable battery 21 is efficiency. Therefore, user can use the walkman for listening to music.

Figure 4A:
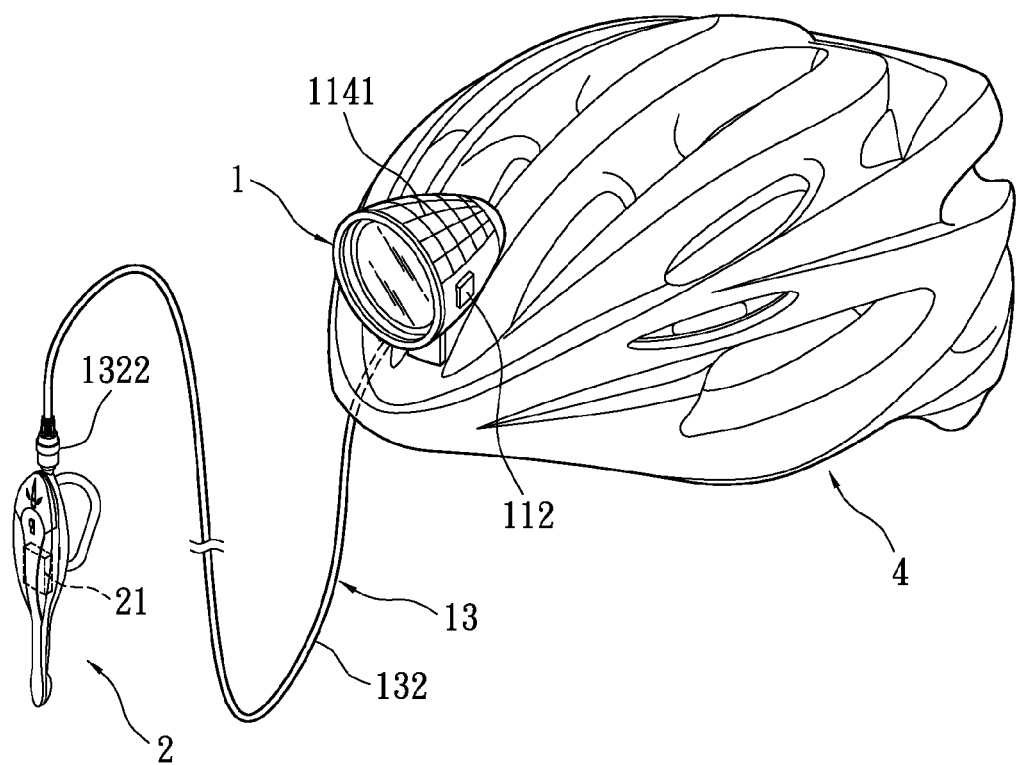
FIG. 4A is a perspective view of the solar lamp of a fourth embodiment of the present invention.

Please refer to FIG. 4A illustrating a fourth embodiment of the solar lamp 1. For example, user could locate the solar lamp 1 on outside of a helmet 4 (top of the helmet 4) or other position of the helmet 4. The solar lamp 1 electrically connects the electronic product 2 which is a Bluetooth headset in the present embodiment. The reserve power unit 1142 of the solar lamp 1 would transmit electric energy into the rechargeable battery 21 of the electronic product 2 as electric energy of the rechargeable battery 21 is efficiency. Therefore, user can use the Bluetooth headset for talking and receiving message.

Figure 4B:
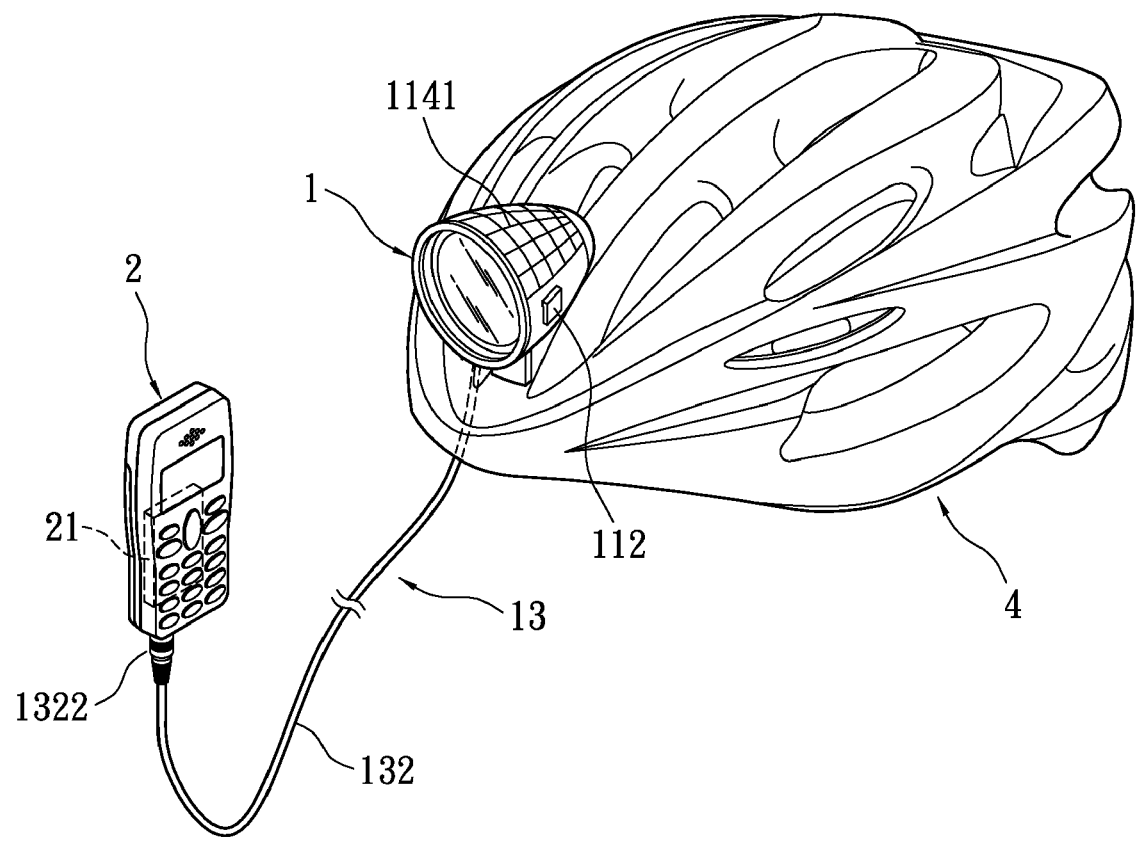
FIG. 4B is a perspective view of the solar lamp of a fifth embodiment of the present invention.

Please refer to FIG. 4B illustrating a fifth embodiment of the solar lamp 1. The solar lamp 1 could be applied with the helmet 4. The solar lamp 1 electrically connects the electronic product 2 which is a cell-phone in the present embodiment. The reserve power unit 1142 of the solar lamp 1 would transmit electric energy into the rechargeable battery 21 of the electronic product 2, or the electronic product 2 would supply electric energy into the reserve power unit 1142 of the solar lamp 1.

Figure 5:
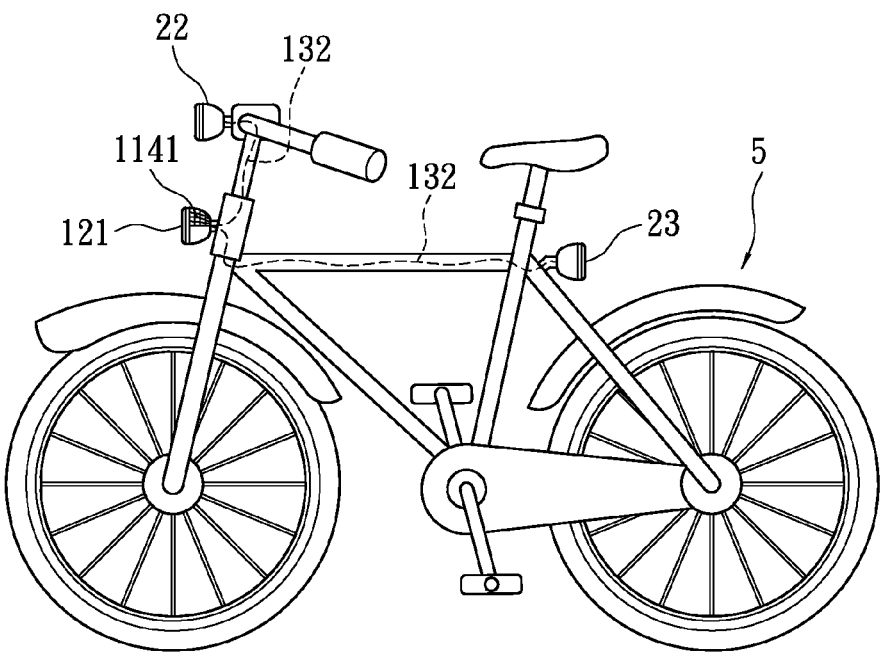
FIG. 5 is a perspective view of the solar lamp of a sixth embodiment of the present invention.

Please refer to FIG. 5 illustrating a sixth embodiment of the solar lamp 1. The solar lamp 1 could be applied with the helmet 4. The solar lamp 1 can be a headlamp 121, and the solar panel 1141 is located on the top surface of the headlamp 121. The headlamp 121 could connect two of the transmission lines 132, and two of the transmission lines 132 separately connect a first auxiliary lamp 22 and a second auxiliary lamp 23. The first auxiliary lamp 22 and the second auxiliary lamp 23 could have battery inside, or could use electric energy supplying from the solar lamp 1 to shine. Therefore, one solar lamp 1 can connect several auxiliary lamps.

Figure 6:
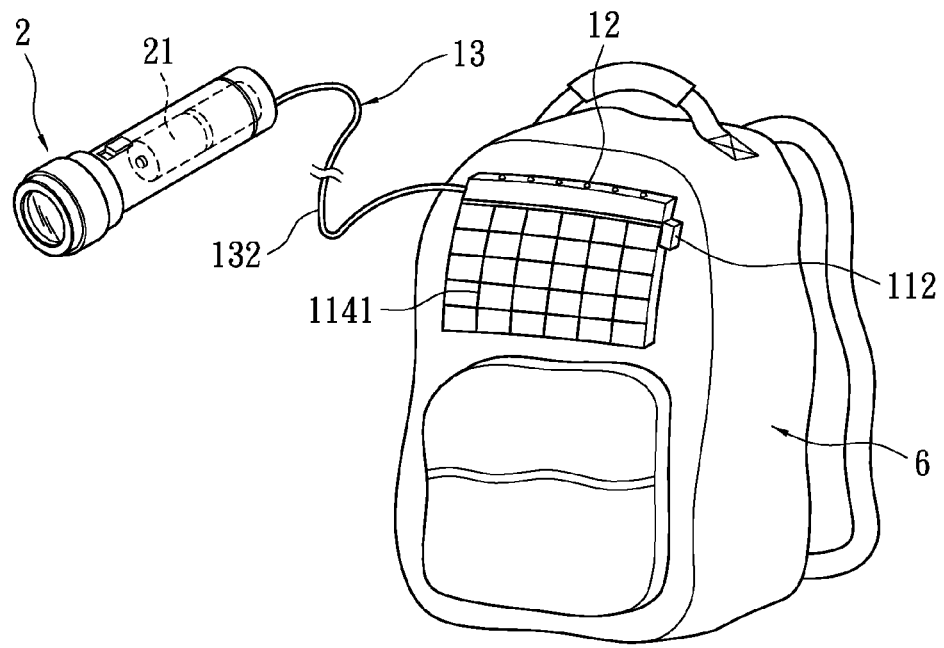
FIG. 6 is a perspective view of the solar lamp of a seventh embodiment of the present invention.

Please refer to FIG. 6 illustrating a seventh embodiment of the solar lamp. Some components of the solar lamp 1 would be located on outside of a backpack 6. The solar panel 1141, the luminescence module 12, and the power switch 112 are pasted on outside of the backpack 6, and the other components of the solar lamp 1 can be located inside the backpack 6. Components of the solar lamp 1 transmit signals by electric line. The luminescence module 12 is formed by several light-emitting diodes (LEDs). The reserve power unit 1142 of the solar lamp 1 transmits electric energy into the rechargeable battery 21 of the electronic product 2 by transmission line 132, and the electronic product 2 is a flashlight in the present embodiment.

Consequently, the solar lamp 1 of the present invention has different types for user requirement. Components of the solar lamp 1 can be further formed separate type which likes the solar power supply apparatus 11 and the luminescence module 12. Furthermore, the electronic product 2 could be Bluetooth headset, cell-phone and so on. The solar lamp 1 would supply electric energy into the electronic product 2, or the electronic product 2 would supply electric energy into the solar lamp 1.

The description above only illustrates specific embodiments and examples of the present invention. The present invention should therefore cover various modifications and variations made to the herein-described structure and operations of the present invention, provided they fall within the scope of the present invention as defined in the following appended claims.

What is claimed is:

1. A solar lamp comprising:
   a body installed on a helmet;
   a solar panel disposed on the body, for transforming a solar energy into an electric energy;
   a reserve power unit electrically connected to the solar panel for storing the electric energy;
   a vibration sensing switch for outputting a sensing signal according to vibration of the solar lamp;
   a control module electrically connected to the reserve power unit and the vibration sensing switch for controlling output of the electric energy storing in the reserve power unit by the sensing signal;
   a luminescence module directly electrically connected to the reserve power unit for receiving the electric energy outputted from the reserve power unit; and
   a transmission module having a port and a transmission line with a first connector and a second connector respectively formed on two ends, one end of the port electrically connected to the reserve power unit, and the other end of the port electrically connected to the first connector and the second connector connected to an electronic product,
   wherein the reserve power unit supplies the electric energy to a rechargeable battery of the electronic product,
   wherein the control module starts the reserve power unit to output the electric energy to the luminescence module when the vibration sensing switch outputs the sensing signal standing for the vibration of the solar lamp.

* * * * *